April 22, 1924.                                                1,491,148
M. E. LAYNE ET AL
THRUST BEARING
Filed April 25, 1922          2 Sheets-Sheet 1
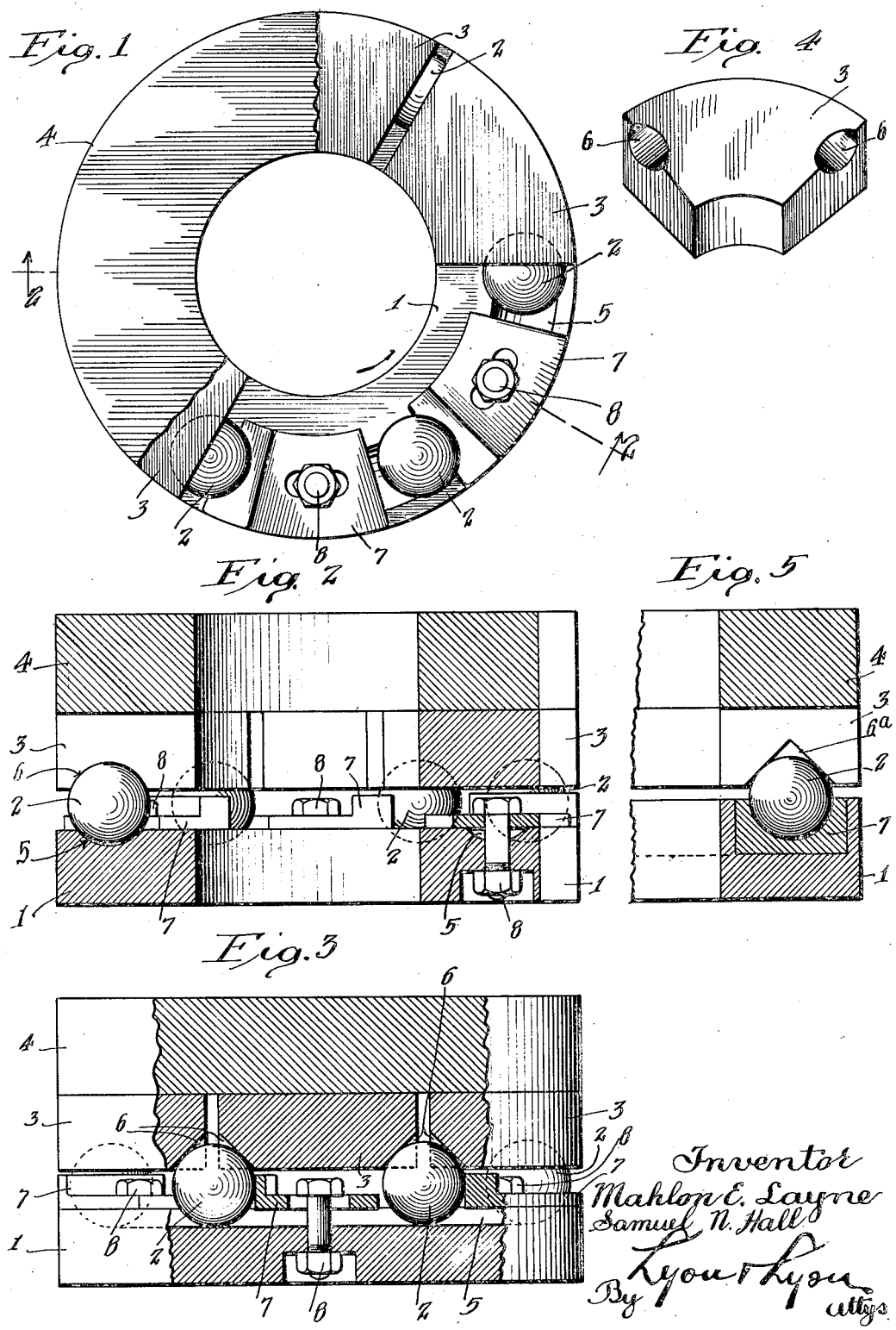

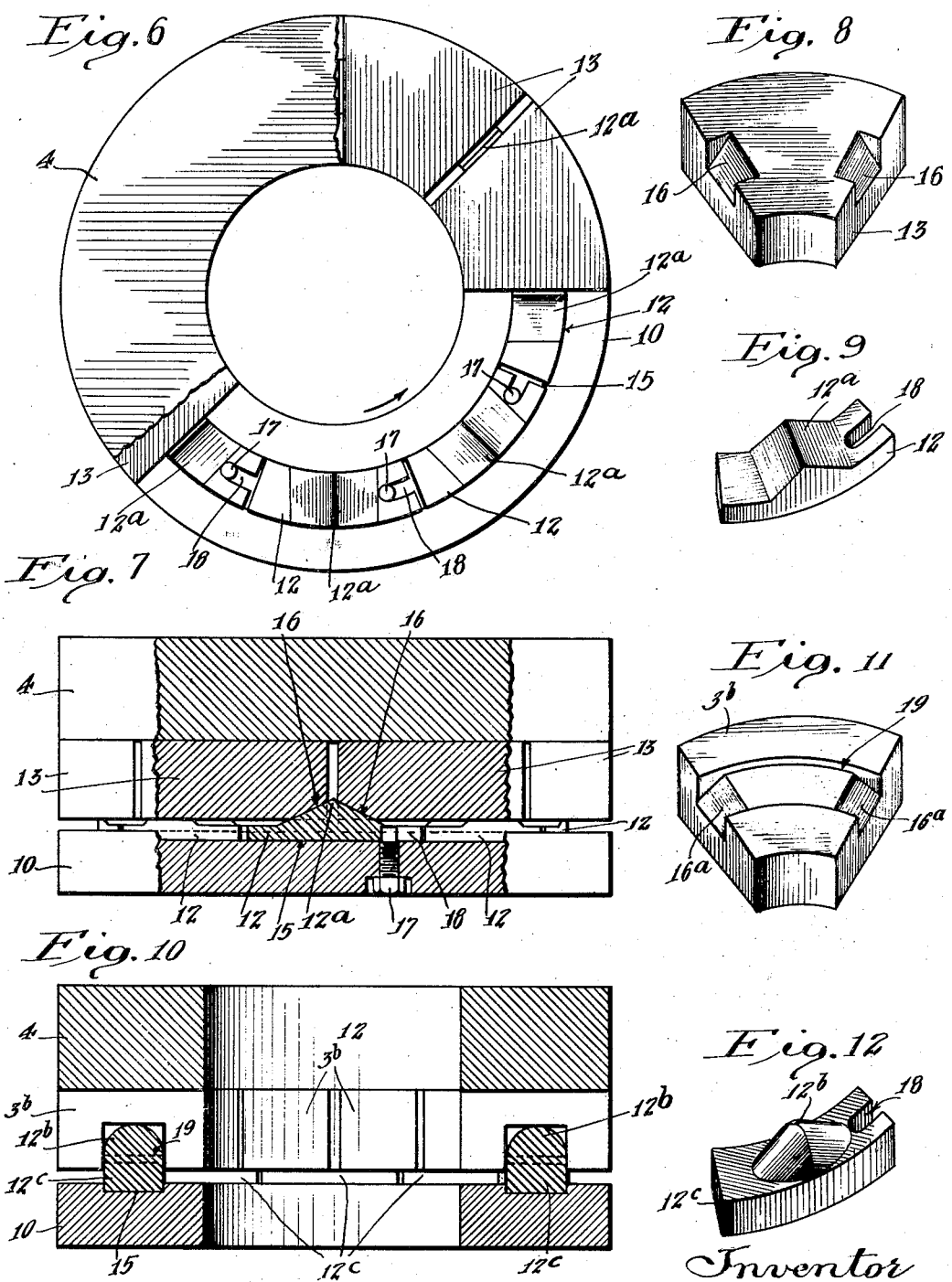

Patented Apr. 22, 1924.

1,491,148

UNITED STATES PATENT OFFICE.

MAHLON E. LAYNE, OF HOUSTON, TEXAS, AND SAMUEL N. HALL, OF LOS ANGELES, CALIFORNIA.

THRUST BEARING.

Application filed April 25, 1922. Serial No. 556,447.

*To all whom it may concern:*

Be it known that we, MAHLON E. LAYNE, a citizen of the United States, residing at Houston, in the county of Harris and State of Texas, and SAMUEL N. HALL, a citizen of the United States, residing at Los Angeles, in the county of Los Angeles and State of California, have invented a new and useful Thrust Bearing, of which the following is a specification.

This invention relates to thrust bearings and is particularly directed to heavy duty bearings adapted to sustain relatively heavy loads rotating at relative high speeds.

An object of the invention is to provide a bearing of the above character including provisions for equalizing the load pressures over the bearing surfaces so as to eliminate the creation at any point of a unit pressure sufficient to destroy the oil film maintained between the bearing surfaces.

Another object is to provide a bearing in which one of the bearing surfaces comprises a plurality of bearing units associated with supporting means circularly movable by an abnormal downward pressure upon one unit to cause a compensating upward movement of the other units to equalize the load over the entire bearing surface.

Another object is to provide a bearing which will be durable and positive in operation and economical and simple in construction.

Various other objects and advantages will be more fully apparent from the following description of the accompanying drawings which form a part of this disclosure, and which illustrate the invention in its preferred forms of embodiment.

Of the drawings:

Fig. 1 is a plan view of our improved bearing, partly broken away to more clearly show the details of construction.

Fig. 2 is a vertical section on line 2—2, of Fig. 1.

Fig. 3 is an elevation, partly in section.

Fig. 4 is a perspective view of one of the segmental bearing shoes looking at its under surface.

Fig. 5 is a detail section of a modified form of structure.

Fig. 6 is a view similar to Fig. 1, illustrating a further modified form of structure.

Fig. 7 is an elevation, similar to Fig. 3 of the form shown in Fig. 6.

Fig. 8 is a perspective view of one of the segmental bearing shoes shown in Figs. 6 and 7, looking at its under side.

Fig. 9 is a perspective view of one of the shoe supporting members shown in Figs. 6 and 7.

Fig. 10 is a central vertical section illustrating a modification of the general form of device shown in Figs. 6 and 7.

Fig. 11 is a perspective view of one of the segmental bearing shoes of the structure illustrated in Fig. 10, looking at its under side, and Fig. 12 is a perspective view of one of the shoe supporting members shown in Fig. 10.

In bearings of the general character herein referred to it is of paramount importance to prevent the creation at any point throughout the bearing surface area of a unit pressure sufficient to destroy the oil film which is necessary for proper lubrication. In general practice such unit pressure may result from an improper alignment of the bearing surfaces in construction or installation, from warping or wearing of such surfaces and supports, derangement of the bearing foundation, and the like. Proper alignment of the bearing surfaces may be accomplished initially by extremely accurate machining and by manual adjustments at great cost, but this alignment is obviously only initially effective and only temporary, due to wear and developments incident to use.

It is therefore desirable to produce a bearing in which the necessity of such close machining is obviated, and in which the proper alignment of the bearing surfaces is not affected by wear, and in producing such a bearing it has been found that it is necessary that at least one of the complementary bearing surfaces should be of a nature which, when subjected to an abnormal load pressure at any one point, will automatically cause a distribution of the excess unit pressure over the entire bearing surface in a pressure equalizing function, serving to prevent bearing failures due to the squeezing out of the oil film between the surfaces.

In the usual well known forms of bearings of this general type the base member of the bearing is carried upon a suitable support and enclosed in an oil tight casing in which the oil level is maintained above the bearing surfaces, but such arrangement is now so well known that those parts which have no direct bearing upon the present invention have been eliminated from the drawings to avoid confusion.

With particular reference to Figs. 1 to 5, the bearing therein illustrated comprises a stationary base 1 supporting a plurality of compensating balls 2, a nonrotatable bearing member consisting of a plurality of segmental bearing shoes 3 cooperating with the balls 2, and a rotatable bearing member 4 which is keyed to rotate with the shaft (the shaft being omitted from the drawings for the sake of clearness).

We provide means for preventing the shoes from moving radially in or out, and this function may be performed by interlocking the cam elements with the shoes. In order to accomplish this, the base 1 has a concentric ball race 5 in which the several cam elements in the form of balls 2 engage and the radial lower corner of each side of the several shoes 3 have angularly disposed circular recesses 6 engaging over the adjacent balls. The recesses 6 cooperate with the balls to prevent the shoes moving radially.

To overcome any tendency of the balls to travel in the direction of rotation of the rotatable bearing member 4 we provide stop members 7 secured by bolts 8 to the base 1 in front of the respective balls. The balls are preferably all at the same level so that they engage directly with the shoes.

With a bearing of this construction it will be evident, particularly with reference to Fig. 3, that an abnormal unit pressure upon any one of the bearing shoes 3 such bearing shoe will be pressed downward spreading apart the balls 2 with which it engages, and that such spreading apart of the supporting balls of any one shoe will cause an equalizing elevation of all the other shoes to distribute the excess load pressure over the entire bearing surface area.

In Fig. 5, is illustrated a slight modification of the ball engaging recesses of the shoes, such recesses 6ª being of angled contour instead of circular as shown in Figs. 1 to 4; these recesses cooperate with the balls also to prevent radial displacement of the shoes; and a further modification of the means supporting the balls 2, may be employed, such means comprising a lead ring 7 seated in a channel groove in the base 1, the balls being pressed into the surface of the lead ring and then pressed slightly in a circular direction to allow for the necessary amount of circular movement of the balls.

In the form of structure shown in Figs. 6 to 9, the base 10 has a concentric groove 15 in which is positioned a plurality of cam blocks 12 each having an angled cam projection 12ª adapted to engage in angled recesses 16 cut in the lower radial corner of the adjacent segmental bearing shoes 13. These cam blocks 12 are permitted to have a sliding movement within the groove 15, the compensating movements of said blocks and of the bearing shoes being the same as that of the shoes 3 and balls 2 of the previously described structure. Each of the blocks 12 is prevented from rotating on the axis of the bearing by sliding in the groove 15 by a stop bolt 17 carried by the base 10 and projecting upwardly into a deep notch or slot 18 in the block.

The modified form of structure illustrated in Figs. 10 to 12 includes all of the elements shown in Figs. 6 to 9, but in this instance the cam projection 12ᵇ is rounded in a direction radially of the bearing. Also the base portions of the several blocks 12ᶜ project upwardly into circularly disposed grooves 19 cut in the under surface of the shoes 3ᵇ and joining the opposite recesses 16ª as shown in Fig. 11. Between the top surface of the base portion of the several blocks 12ᶜ and the upper surface of the grooves 19 in the segmental bearing shoes 3ᵇ, enough clearance is provided to permit of the vertical compensating movements of the several shoes.

In the above described structures we have provided a load supporting bearing member composed of a plurality of vertically movable sections or shoes and supported by a plurality of circularly movable elements having a cam action on the cooperating shoes and functioning so that as an individual shoe is subjected to an abnormal load pressure its downward movement causes a circular horizontal movement of the supporting elements which is transmitted and converted into an upward vertical movement of the other shoes of the compensating bearing member.

By our construction we eliminate to a maximum degree the necessity for close accurate machine work and provide a bearing of long life and which is susceptible of quick easy repairing and replacement of parts.

While the invention as shown and described is well adapted to fulfill all of the objects primarily stated, it is to be understood that it is not intended to confine the invention to the embodiments herein disclosed, for it is susceptible to embodiment in various other forms, all coming within the scope of the claims which follow.

We claim:

1. A thrust bearing comprising relatively rotatable members, a plurality of vertically movable radial bearing shoes engaging the bearing surface of one of said members and having angled cam surfaces on their opposite radially disposed edges, and a plurality of circularly movable cam elements carried by the other of said members, each of said elements positioned between and having interlocking engagement with the cam surfaces of two adjacent shoes to support the shoes, equalize the pressure upon the shoes, and prevent radial displacement of the shoes.

2. A thrust bearing comprising relatively rotatable members, a plurality of vertically movable radial bearing shoes engaging the bearing surface of one of said members and having angularly disposed recesses in their opposite radially disposed edges, and a plurality of circularly movable balls carried by the other of said members, each ball positioned between and engaging within the recesses of two adjacent shoes to support the shoes.

3. A thrust bearing comprising relatively rotatable members, a plurality of radial bearing shoes engaging the bearing surface of one of said members, a plurality of circularly movable cam elements carried by the other of said members, each of said elements positioned between, supporting and in interlocking engagement with two adjacent bearing shoes, and means limiting the circular movement of the cam elements in the direction of rotation to prevent a rotation of the bearing shoes.

4. A thrust bearing comprising relatively rotatable members, a plurality of radial bearing shoes engaging the bearing surface of one of said members, a plurality of circularly movable balls disposed at the same level carried by the other of said members, each ball positioned between and supportingly engaging two adjacent bearing shoes, each shoe having a recess at each end receiving the adjacent ball, and means limiting the circular movement of the balls in the direction of rotation to prevent a rotation of the bearing shoes, said recesses co-operating with the balls to prevent radial displacement of the shoes.

MAHLON E. LAYNE.
SAMUEL N. HALL.

Witnesses:
FRANK ANDREWS,
W. R. GORDON.